Nov. 3, 1925.　　　　　　　　　　　　　　　1,559,913
J. H. ROOF ET AL
TREE WAGON
Filed Nov. 6, 1924　　　　3 Sheets-Sheet 3

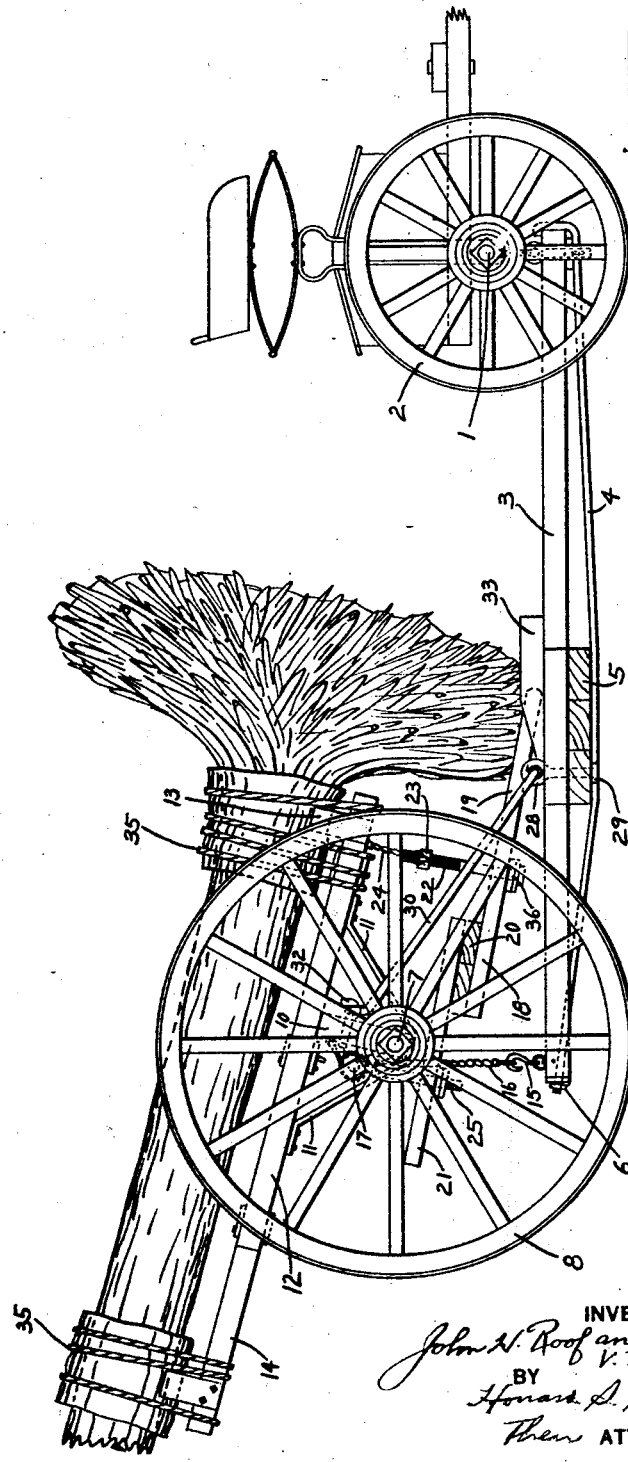

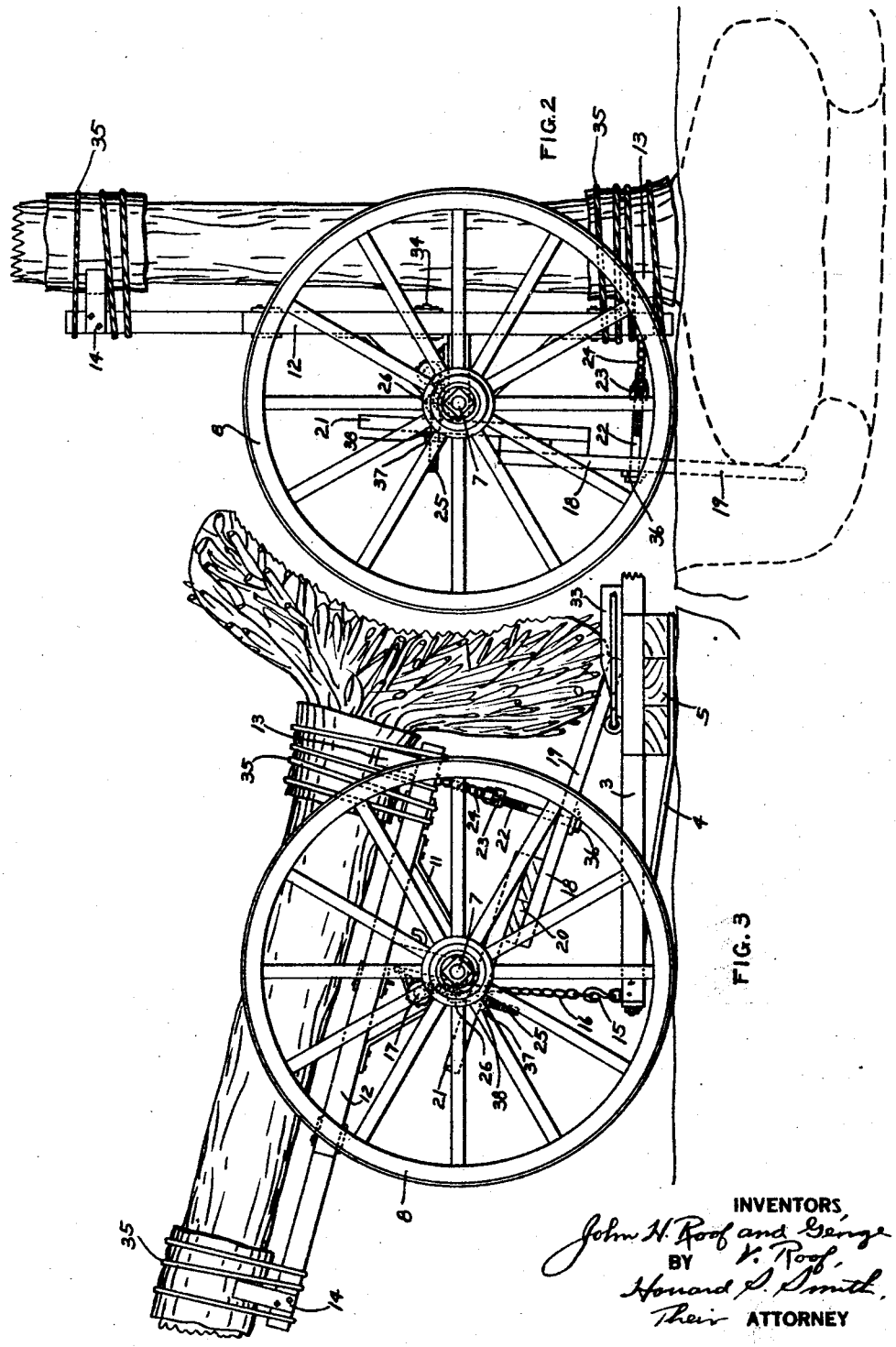

INVENTORS
John H. Roof and George V. Roof
BY
Howard S. Smith
Their ATTORNEY

Patented Nov. 3, 1925.

1,559,913

UNITED STATES PATENT OFFICE.

JOHN H. ROOF AND GEORGE V. ROOF, OF DAYTON, OHIO.

TREE WAGON.

Application filed November 6, 1924. Serial No. 748,090.

*To all whom it may concern:*

Be it known that we, JOHN H. Roof and GEORGE V. ROOF, citizens of the United States, residing at Dayton, in the county of Montgomery and State of Ohio, have invented certain new and useful Improvements in Tree Wagons, of which the following is a specification.

This invention relates to new and useful improvements in tree wagons, and has particularly reference to a tree wagon for extracting and setting up a tree as well as for transporting it without injury to its roots and bark.

It is the principal object of our invention to provide an efficient, strong and easily-controlled wagon which will not only safely transport a tree from one location to another, but which will, without injury to its roots and bark, extract the tree from the ground and load it.

Our improved means contemplate, in addition to the detachable wheel-supported axle which carries a saddle beam that is made fast to the trunk of a tree, a false boat which is placed vertically in the hole around the roots of the tree, and then attached to the axle to lift up those roots from the bottom when a pull is exerted upon the outer end of the saddle beam. Therefore, during the extraction of the tree from the ground, the upward pull is not exerted through the saddles upon the trunk, which tends to scrape and burst its bark, but the lifting movement will be from below through the false boat which engages beneath the roots to elevate them when the extracting pull is exerted upon the outer end of the saddle beam.

After the tree has been extracted from the ground, it is drawn by the rear wheeled axle over a bottom boat or platform which is secured to the front axle and then to the rear one. Our false boat which lifts up the roots of the tree during the extracting operation, also carries those roots upon the bottom boat without permitting them to engage it. This it would do in the absence of the false boat, resulting in much of the dirt being scraped from its roots. This false boat also tends to hold the tree steady during the time it is being transported to its new location.

It is still another object of our invention to provide an adjustable head-rest on the saddle beam, for the tree. This enables said beam to be readily accommodated to tree trunks of different lengths.

Other important and incidental objects will be brought out in the following specification and particularly set forth in the subjoined claims.

Figure 4:
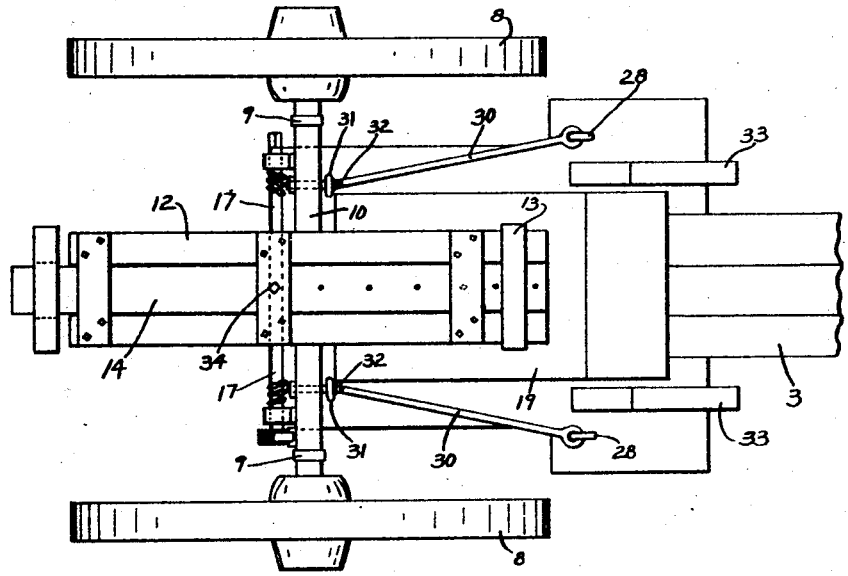
Figure 5:
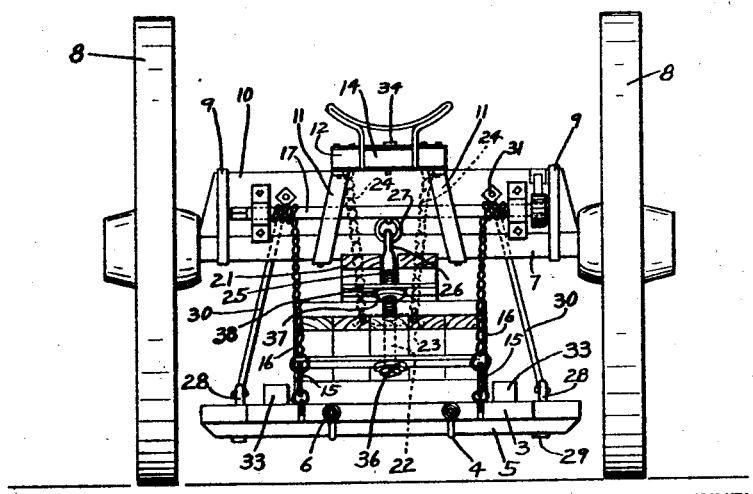

In the accompanying drawings, Figure 1 is a side elevational view of our tree wagon with a tree loaded thereon. Figure 2 is a side elevational view of the rear truck in its extracting position, showing the saddle beam attached to a tree and the false boat in the trench around the tree. Figure 3 is a side elevational view of the rear truck of the wagon, with the tree lashed in place and the false boat resting on the bottom one. Figure 4 is a plan view of the rear truck, showing its construction and means of operation. And Figure 5 is a rear elevational view of said truck.

Referring to the accompanying drawings for a detailed description of the form of embodiment of our invention illustrated therein, the numeral 1 designates a front axle supported by wheels 2, one of which is shown in Figure 1. Suitably secured to, and suspended from, the front axle 1 is the front end of a bottom boat or platform 3 constructed of heavy beams that are preferably reinforced below by elongated rods 4 which, at their middle portions, bear against a block 5 secured to the underside of said platform. The front ends of these rods 4 are turned upwardly and over the front of the platfrom 3, while their rear ends are passed through inclined holes in the latter and threaded to receive nuts 6. (See Figure 1.) By turning these nuts, the reinforcing rods are properly tensioned.

The numeral 7 designates a rear axle upon the middle portion of which, between the wheels 8, 8, there is secured by clamping members 9, 9 or other suitable means, a cross block 10. Secured to the middle portion of the axle 7 are two V-shaped bars 11, 11 which are turned outwardly at their ends to support a saddle beam 12 to the lower end of which a stationary saddle 13 is secured. Longitudinally adjustable along the upper part of the beam 12 is a saddle or head rest extension 14 to permit the saddle beam to be accommodated to tree trunks of different lengths.

Secured to the top part of the end portion of the platform or bottom boat 3, are two hooks 15, 15 which are received by the lower links of chains 16, 16 that are wound upon a windlass 17 secured to the rear axle block 10 to connect said bottom boat to the rear truck of the wagon. By means of the windlass the rear end of the boat 3, when hooked to the chains 16, 16, may be raised a desired distance from the ground after a tree has been loaded upon the wagon. (See Figures 1, 3 and 5.)

For the purposes hereinbefore referred to, we provide an additional or false boat or platform 18 which comprises a front beam section 19, a short middle superimposed section 20 and a rear section 21 mounted upon the latter. Formed in the middle part of its front section 19, is a hole adapted to receive the outer end of a bolt 22 which receives at its inner end a tapped cross member 23 having hook ends. The latter enter the lower links of chains 24, 24 secured to the front under-side portion of the saddle beam 12. The rear section 21 of the false boat 18 is also formed with a middle hole to receive the outer end of a bolt 25 which is formed at its upper end with a hook portion 26 for entrance into a ring 27 which is secured to the middle portion of the rear side of the axle block 10. (See Figures 3 and 5.)

Passing through registering holes in the bottom boat 3 and the block 5 beneath, on each side thereof, is an eye bolt 28 which receives on its lower end a nut 29. To the upper end of each eye bolt 28 the lower end of a bracing rod 30 is connected. The upper end of each bracing rod 30 is formed with an eye portion 31 which is connected to a hook bolt 32 secured to the axle block 10. (See Figures 1, 4 and 5.) These bracing rods 30, 30 assist the chains 16, 16 in securing the rear portion of the bottom boat 3 to the rear axle of the wagon.

Secured upon the middle portion of the bottom boat 3, one on each side thereof, are two guide blocks 33, 33 which maintain the bottom section 19 of the false boat 18 in a middle position upon it. (See Figures 3 and 5.)

When it is desired to extract a tree from the ground, a deep circular trench is dug around it and the rear truck of our wagon wheeled up to it. The saddle beam 12 is then brought to a vertical position against the trunk of the tree as shown in Figure 2, after which its extensible saddle portion 14 is drawn out to the proper length to properly conform or accommodate the saddle beam to the tree. The adjustable saddle portion 14 of the saddle beam 12 may be held in its adjusted position by a removable pin 34 which is adapted to be inserted through a hole in the saddle beam proper into a registering hole in the portion 14. (See Figures 2 and 4.)

With the stationary saddle 13 firmly against the lower part of the tree trunk and its extensible saddle part 14 solidly against its upper part, both parts are then lashed to the tree trunk by cables such as the ropes 35, 35. The false boat 18 is then brought to a vertical position behind the saddle beam 12, to sink its lower section 19 into the trench against the roots of the tree as shown in Figure 2. The bolt 22 is then passed through the hole in the section 19 until a washer 36 is pressed by the head of the bolt against said section, after which the cross member 23 is applied to its inner end to connect it, through the chains 24, 24, to the saddle beam. The bolt 25 is also passed through the hole in the rear section 21 of the false boat 18 and a nut 37 applied to that bolt and screwed upon it a substantial distance. Between said nut 37 and the false boat a washer 38 is placed. (See Figures 2, 3 and 5.)

With the false boat 18 thus firmly secured to the rear truck, a pull exerted upon the outer end of the saddle beam 12 will cause the lower part of the false boat to raise the tree roots from the bottom to relieve a vertical pull, being communicated, with injurious results, to the tree through the saddles 13 and 14. Were the saddles through their engagement with the tree trunk, to lift the tree from the ground, its bark would be scraped off by them, but in this instance they are relieved of this function by our false boat which engages under the roots of the tree to raise it from the bottom.

After the tree has been uprooted by our improved extracting means, it is turned to the inclined position shown in Figure 3 and then drawn by the rear truck over the bottom platform or boat 3, with its roots resting upon the false boat 18 to protect them from an engagement with the bottom boat that would brush the earth from them. In other words, instead of the roots themselves being drawn upon the bottom boat 3, they are carried upon it by the false boat which protects them from being scraped.

After the rear truck of the wagon has the position over the rear end of the bottom boat 3, shown in Figure 3, the hooks 15, 15 are secured to the chains 16, 16 and the windlass 17 operated to raise the bottom boat a desired distance from the ground. The tree is now ready to be transported by the wagon to its new location, with the false boat 18 steadying it against side sway. Should it be necessary to pass under trolley wires or the like, the windlass 17 may be turned to raise the rear end of the bottom boat which, through the bracing rods 30, 30, will tilt the rear axle 7 sufficiently to bring the top of the tree below the wires to clear them.

Having described our invention, we claim:

1. A tree wagon comprising a front axle and a rear axle, a beam secured to the rear axle for movement thereby to a vertical position against a tree, a bottom platform attachable to said axles, a second platform adapted to be placed behind said rear axle to engage the roots of a tree when said beam is in a vertical position against the latter, the second platform being formed with bolt holes, and bolts pivotally secured to said rear axle and beam for passage through the holes in the second platform to removably secure the latter to them for the purpose specified.

2. A tree wagon comprising a front axle and a rear axle, a beam secured to the rear axle to support the trunk of a tree, a bottom platform attachable to said axles, a windlass on the rear axle for raising the rear end of the bottom platform from the ground, and bracing rods projecting from the middle portion of said platform to the rear axle, to tilt the latter rearwardly when the bottom platform is elevated by the windlass, to lower the top of the tree supported by said beam for the purpose specified.

In testimony whereof we have hereunto set our hands this 3rd day of November, 1924.

JOHN H. ROOF.
GEORGE V. ROOF.